United States Patent [19]

Spykerman et al.

[11] Patent Number: 5,320,414
[45] Date of Patent: Jun. 14, 1994

[54] ARTICULATED ARMREST

[75] Inventors: David J. Spykerman; David M. Sovis; Wesley D. Mersman; Sheldon J. Watjer, all of Holland, Mich.

[73] Assignee: Prince Corporation, Holland, Mich.

[21] Appl. No.: 914,791

[22] Filed: Jul. 16, 1992

[51] Int. Cl.$^5$ .......................... A47C 7/54; B60N 2/46
[52] U.S. Cl. ........................ 297/411.32; 297/411.33
[58] Field of Search ............. 297/411.32, 411, 33, 297/411.29

[56] References Cited

U.S. PATENT DOCUMENTS

| | | | |
|---|---|---|---|
| 535,168 | 3/1895 | Krehbiel | 297/115 |
| 3,197,254 | 7/1965 | Hendrickson | 297/162 |
| 3,368,842 | 2/1968 | Polsky | 297/411.33 |
| 3,547,488 | 12/1970 | Barnes | 297/162 |
| 3,550,958 | 12/1970 | Krein | 297/417 |
| 3,556,588 | 1/1971 | Monyer et al. | 297/162 |
| 3,565,484 | 2/1971 | Dargelo | 297/417 |
| 3,598,442 | 8/1971 | Miller | 297/162 |
| 3,857,605 | 12/1974 | Fantoni | 297/162 |
| 3,968,992 | 7/1976 | Hogan | 297/162 |
| 4,411,471 | 10/1983 | Ponzellini | 297/417 |
| 5,104,191 | 4/1992 | Tame | 297/411.32 |

FOREIGN PATENT DOCUMENTS

| | | | |
|---|---|---|---|
| 3432084 | 3/1986 | Fed. Rep. of Germany | 297/417 |
| 2302881 | 5/1976 | France | 297/417 |
| 439141 | 3/1986 | France | . |
| 104423 | 6/1982 | Japan | 297/417 |

Primary Examiner—Alexander Grosz
Attorney, Agent, or Firm—Price Heneveld Cooper DeWitt & Litton

[57] ABSTRACT

A blade-shaped armrest pivots along mutually orthogonal axis to provide compact storage adjacent the side of a seat and yet provide a wide support surface when moved to a lowered use position. In one embodiment, the armrest automatically rotates in two planes as it is moved between a stored position and the use position. In another embodiment of the invention, an armrest is pivotally mounted forwardly of a pivoted support member and both members rotated together from a generally vertical position to a horizontal position and the armrest is then rotated with respect to the support member to a horizontal position for use. A releasable latch holds the armrest in a selected position with respect to the support member.

18 Claims, 4 Drawing Sheets

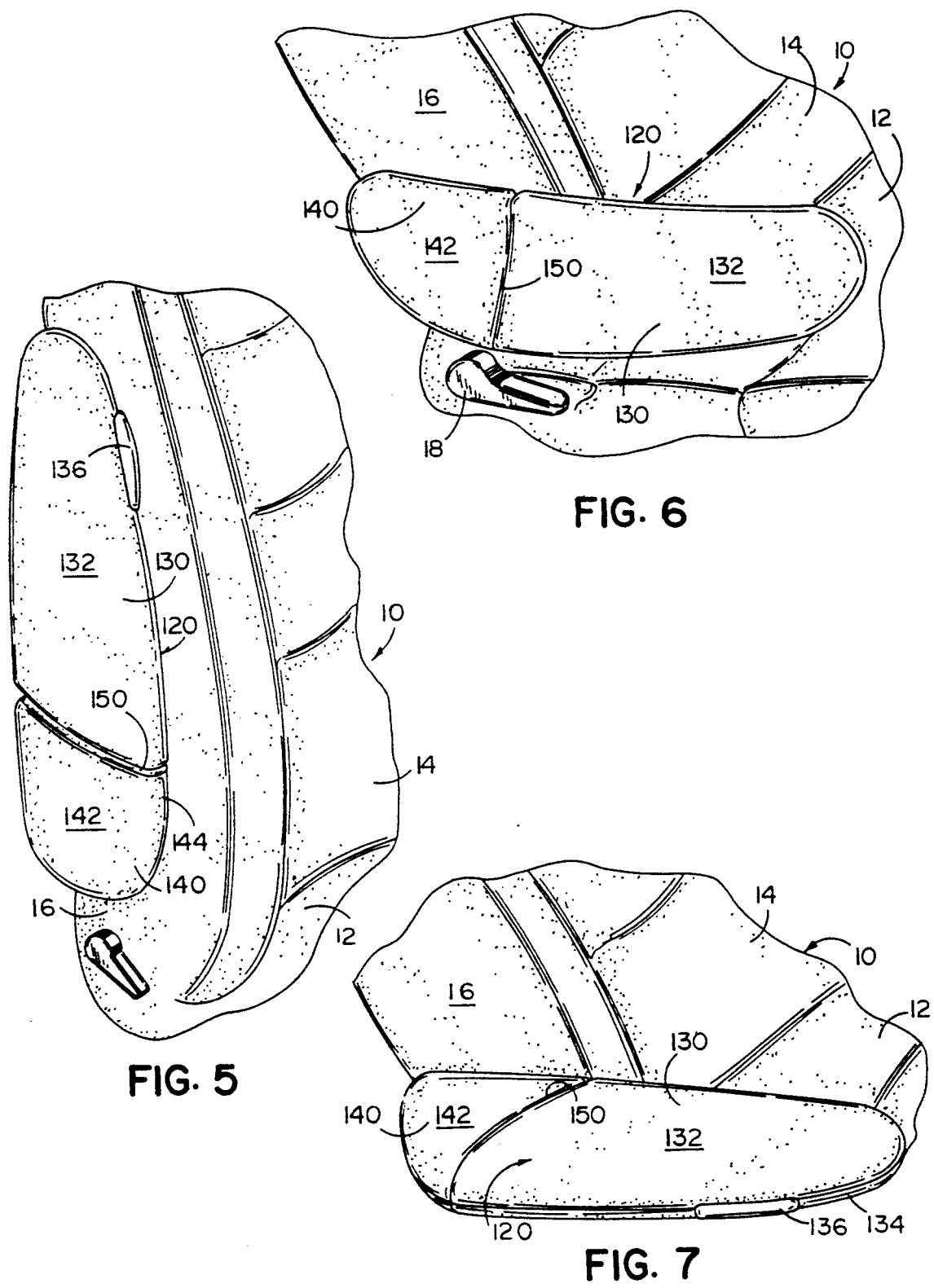

ARTICULATED ARMREST

BACKGROUND OF THE INVENTION

The present invention relates to a vehicle armrest and particularly one which moves in two planes as it is extended from a compact storage position to a use position.

Armrests typically pivot between a raised position to a lowered use position in a vertical plane. The armrest occupies the area immediately adjacent the side of the seat back when in a retracted stored position and rotates in a single axis and in a vertical plane to a lowered use position. In vans and particularly mini-vans, it is desirable to allow room between front seats such that a person can move from the front of the vehicle to the rear area of the vehicle. Conventional armrests severely restrict such access.

Also, with the advent of today's relatively compact vehicles, the space between front seats typically cannot easily accommodate a pair of armrests, with one each for the driver and passenger sides, let alone a pair of armrests which have a width which provides comfortable support of one's forearm. Thus, single armrests are usually provided or the armrests are relatively narrow and therefore uncomfortable.

Further, in many vehicles, a parking brake lever extends between the front seats and an armrest can interfere with its operation when lowered. In order to overcome the latter problem, an armrest is disclosed in Offenlegungsschrift DE 3432084 A1 published on Mar. 13, 1986, which pivots downwardly from a seat back and then rotates outwardly to present a concave edge which faces the seat occupant. A linear edge is spaced from an adjacent armrest of mirror image construction to provide access to a parking brake control lever. Although such a design provides for two plane movement of an armrest between storage and use positions, it does not provide easy control for the user nor does it provide an armrest of a substantially uniform width along its length for providing comfortable support for a persons arm.

SUMMARY OF THE PRESENT INVENTION

The present invention overcomes the difficulty of providing a conveniently useable armrest which can be used in relatively small-sized vehicles and included on both front seats when moved between a compact stored position and a lowered use position. In one embodiment, the armrest automatically rotates in two planes as it is moved downwardly from a stored position in which a narrow storage silhouette is presented when adjacent the seat back to present a relatively wide support surface when in a use position.

In a preferred embodiment of the invention, an armrest is hingedly coupled to an intermediate member which in turn is pivotally coupled to the vehicles seat. Control means extending between the intermediate member and the armrest respond to the pivoting of the intermediate member to move the armrest in a plane orthogonal to the pivoting of the intermediate member with respect to the seat to automatically extend the armrest to a use position when moved from a generally vertically extending storage position adjacent the seat back to a lowered generally horizontal use position.

In another embodiment of the invention, an armrest is pivotally mounted forwardly of a pivoted support member and both members rotated together from a generally vertical position to a horizontal position and the armrest is then rotated with respect to the support member to a horizontal position for use. Releasable latch means holds the armrest in a selected position with respect to the support member.

In both embodiments, the armrest moves in two planes as it is moved between a stored position and a use position to provide a relatively thin profile when stored and a substantially uniform width support surface of a width to provide a comfortable support surface for a users arm when in the use position. Thus, the system of the present invention provides a conveniently usable vehicle armrest which can be compactly stored when not in use and yet provide a relatively wide, comfortable armrest for use when extended. These and other features, objects and advantages of the present invention will become apparent upon reading the following description thereof together with reference to the accompanying drawings in which:

BRIEF DESCRIPTION OF THE DRAWINGS

FIG. 5 is a fragmentary, perspective view of a vehicle seat and armrest of an alternative embodiment of the present invention shown in a retracted stored position adjacent the seat back;

FIG. 6 is a fragmentary, perspective view of the armrest shown in FIG. 5 shown in a downwardly rotated intermediate position;

FIG. 7 is a fragmentary, perspective view of the armrest shown in FIGS. 5 and 6 shown in a downwardly rotated use position;

DETAILED DESCRIPTION OF THE PREFERRED EMBODIMENT

Figure 1:
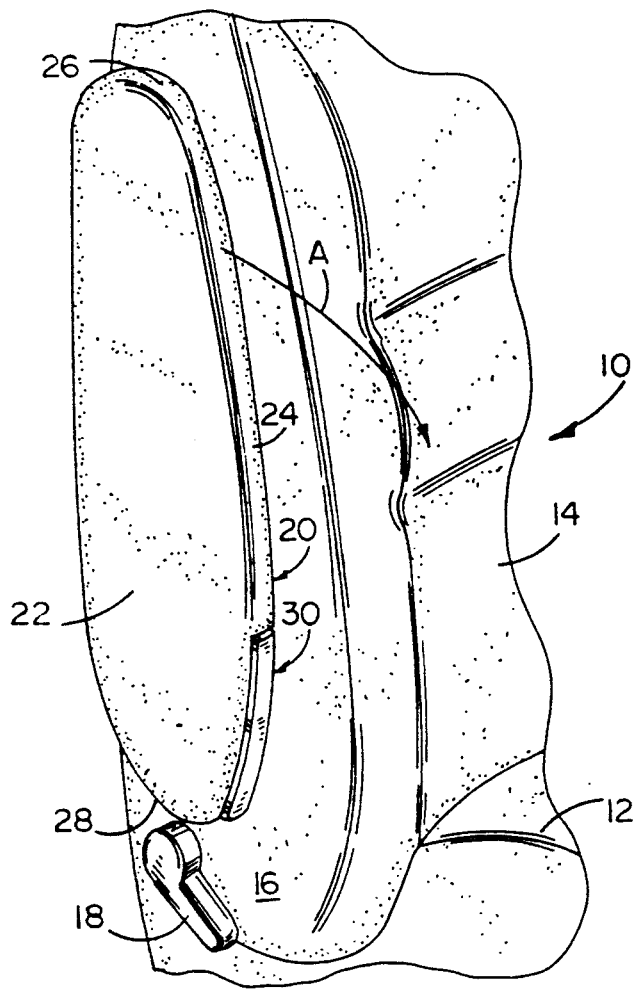
FIG. 1 is a fragmentary, perspective view of a vehicle seat and an armrest constructed according to one embodiment of the present invention shown in a retracted stored position adjacent the seat back.

Referring initially to FIG. 1, there is shown a driver's side seat 10 for a vehicle such as an automobile. The seat includes a seat support 12 and a back support 14, both of which are typically pivotally mounted to one another for allowing access to the rear seat of the vehicle or for adjustment of the back 14 with respect to the seat 12. The vehicle seat back 14 includes an inwardly facing side 16 and conventional underlying structure to define the seat. A control lever 18 for adjusting the tilt angle of the seat back 14 with respect to the seat support 12 is coupled to a suitable interconnecting mechanism to allow the adjustment of the seat back angle as desired. Positioned above this control is an armrest assembly 20 embodying the present invention.

Figure 2:
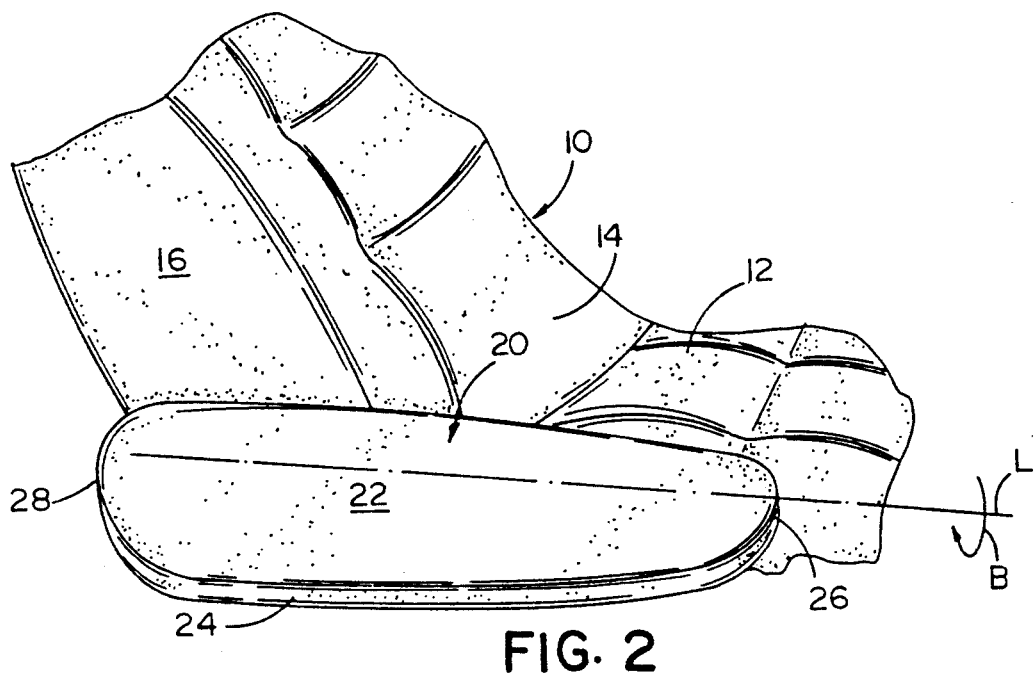
FIG. 2 is a fragmentary, perspective view of the armrest shown in FIG. 1 shown in a downwardly rotated use position.

The armrest is a relatively thin blade-like member having a substantial width to provide a wide arm supporting upper surface 22 when in a use position shown in FIG. 2, but a thin profile when stored as seen in FIG.

1. The armrest includes a forwardly facing narrow edge 24 as viewed in FIG. 1, an outer end 26, and a bottom or rear end 28. The relatively thin body of the armrest as viewed in FIG. 1 rests closely adjacent the side 16 of seat 10 such that an armrest of similar construction can be mounted to the side of a passenger side seat (not shown) in facing spaced relationship to armrest 20. The armrest pivots simultaneously in two planes as it is lowered from the stored position shown in FIG. 1 to the use position shown in FIG. 2. Thus, as the armrest is lowered in a direction indicated by Arrow A in FIG. 1, it also rotates outwardly and away from the seat 10 generally about its longitudinal axis L as indicated by Arrow B in FIG. 2 to the use position. To achieve this motion, armrest 20 is pivotally mounted to a planar intermediate support member 30 which, in turn, is pivotally mounted to the side 16 of seat 10 by a pivot axle 32 (FIGS. 3 and 4).

Axle 32 has one end 33 anchored to the seat back supporting structure (shown schematically as reference 31') to prevent rotation of the relatively short pivot axle 32 with respect to the seat. An opposite end 34 of axle 32 is fixedly secured to one end of a link 98 as described in greater detail below. The intermediate member 30 includes an aperture 31 formed therethrough to allow clearance for the pivot axle 32 and allow intermediate member 30 to pivot with respect to the fixed pivot axle 32. The intermediate member 30 preferably is made of a steel plate and pivot rod 32 which fits within aperture 31 using a bushing to provide a predetermined rotational torque between the intermediate member 30 and rod 32 which holds the armrest in a raised position as shown in FIG. 1 until physically moved as desired by the operator.

Figure 3:
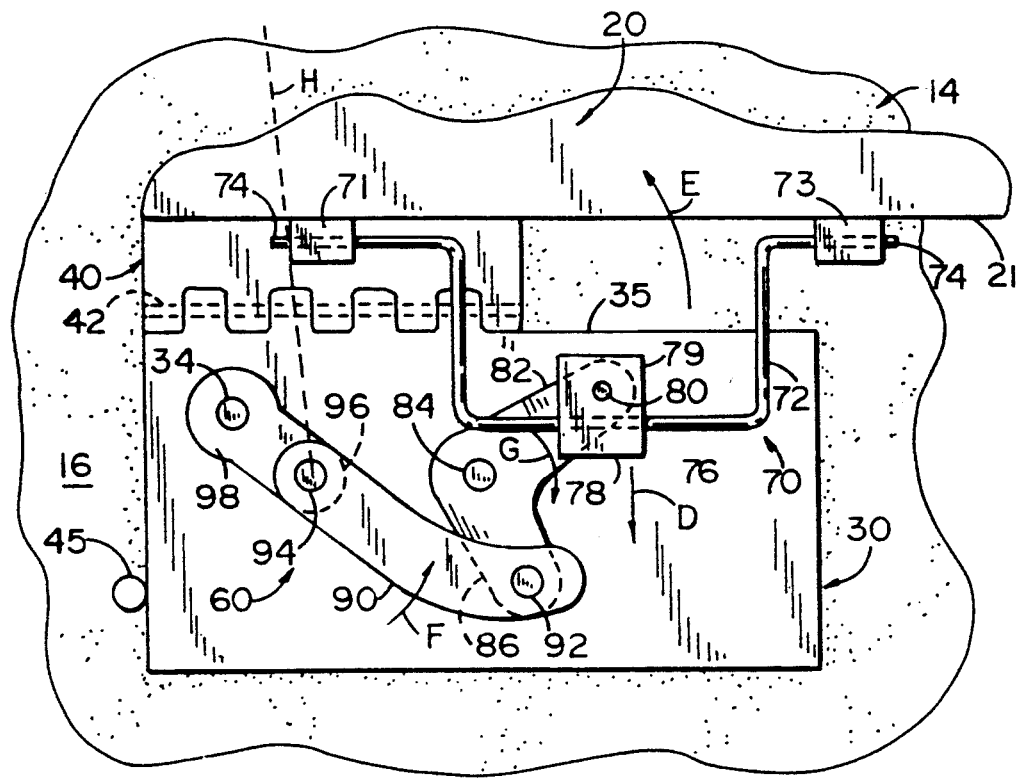
FIG. 3 is a side elevational view of the control mechanism for pivoting the armrest between the stored and use positions.
Figure 4:
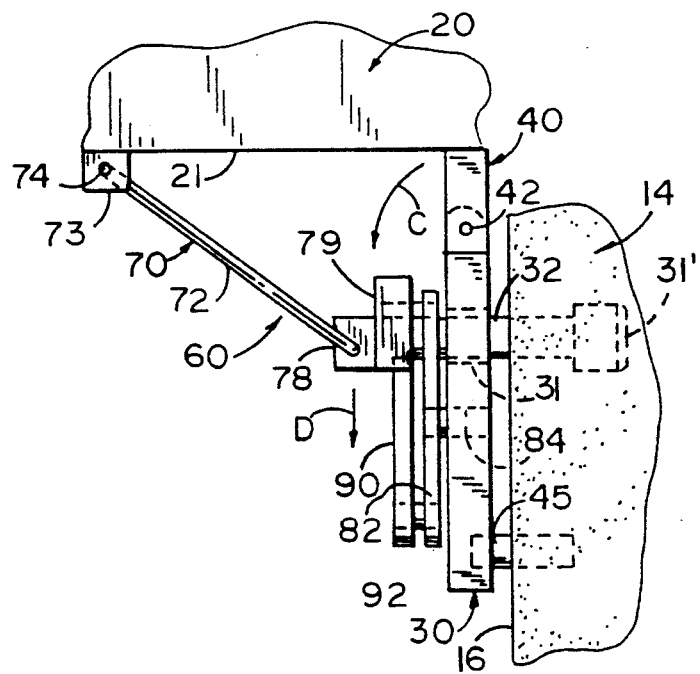
FIG. 4 is a front elevational view of the structure shown in FIG. 3.

As seen in FIGS. 2, 3 and 4, when the armrest 20 is in a lowered use position with the support surface 22 extending horizontally, the plane of the relatively flat armrest body 20 is generally horizontal while the planar intermediate support member 30 remains in a vertical plane as it rotates between the retracted position, as shown in FIG. 1, and the position shown in FIG. 3. The intermediate member 30 rotates about pivot axle 32 during its operation and means 60 intercouple member 30 and armrest 20 such that as the armrest and member coupled thereto are moved from the stored position, shown in FIG. 1 to the use position shown in FIG. 2, the armrest 20 is automatically moved outwardly to a horizontal use position. This is achieved by the intercoupling means 60 shown in FIGS. 3 and 4 and now described.

Referring to FIGS. 3 and 4, the armrest body includes a lower surface 21 opposite arm supporting surface 22 and which is hingedly mounted toward its rear end 28 by means of a hinge 40 to the upper edge 35 of intermediate member 30. Hinge 40 is preferably integral with members 21 and 30 and allows the armrest 20 to pivot from the horizontal position, seen in FIGS. 2-4, downwardly as illustrated by Arrow C (FIG. 4) to a collapsed low-profile position as shown in FIG. 1 about the pivot axle 42 of hinge 40. To achieve this automatic control and movement of the armrest as it is lowered from a stored position to a use position, intercoupling means 60 includes several elements coupling the armrest to the intermediate plate 30.

The intercoupling means 60 includes a pivoted bail assembly 70 having a wire rod bail 72 with opposite ends 74 pivotally mounted to spaced mounting bosses 71 and 73 secured to the lower side 21 of armrest 20.

The opposite ends 74 of the bail extend through the mounting bosses 71 and 73. The center leg 76 of the bail pivotally extends through a mounting block 78 which moves downwardly as shown by Arrow D in FIG. 4 and described in detail below to pivot the armrest in a direction indicated by Arrow C. To effect movement of the mounting block 78, it is pivotally coupled by block 79 and pivot axle 80 to a generally L-shaped link 82 which is pivotally mounted by rivet 84 to intermediate support member 30. Members 78 and 79 may be made of steel with a polymeric bushing. The opposite end 86 of link 82 is pivotally coupled to a curved cross-link 90 by rivet 92. The end of cross-link 90 opposite pivot axle 92 is pivotally coupled by rivet 94 to end 96 of a third straight link 98 which has its end remote from pivot axle 94 fixed to end 34 of pivot axle 32. In the lowered use position seen, a stop 45 extends from the side 16 of seat back 14, as seen in FIGS. 3 and 4, to prevent rotation of the intermediate member 30 beyond the horizontal position shown in these FIGS. In this position with plate 30 held in a horizontal position, the linkages 82, 90 and 98 are locked in position against further movement and bail assembly 70, including the U-shaped bail member 72, is vertically locked by the immobility of block 78. This holds the armrest in a horizontal arm supporting position as shown in FIGS. 2-4.

In order to fully understand the movement of the linkages when the armrest is raised in a direction indicated by Arrow E in FIG. 3 toward the stored position shown in FIG. 1, it should be remembered that link 98 is anchored to the fixed pivot rod 32 and member 30 moves with respect to fixed link 98. Thus, link 98, rod 32 and the seat back 14 remain stationary while the armrest and intermediate member 30 rotate with respect thereto. For purposes of clarity, in FIG. 4, link 98, shown in FIG. 3, is omitted but lies on the inside of link 90 between the inside surface of link 90 and the outside surface of intermediate member 30.

As the armrest is rotated upwardly as indicated by Arrow E, member 30 rotates with the armrest while the link 90 pivots in a counterclockwise direction indicated by Arrow F in FIG. 3 about pivot axle 94. This, in turn, pivots link 82 about pivot axle 84 in a clockwise direction as indicated by Arrow G in FIG. 3 which in turn draws mounting block 78 and the bail assembly 70, pivotally mounted thereto, downwardly as indicated by Arrow D in FIGS. 3 and 4 with respect to member 30. Thus, the movement represented by Arrows D, F and G show the movement of the links and bail member with respect to member 30 while Arrow E indicates the movement of member 30 with respect to fixed seat back 14. With the seat in the fully raised position, the pivot axles 94, 92 and 84 are substantially in line with one another and lay on an axis generally shown by the dashed line H of FIG. 3. In this aligned position, the armrest is in a position shown in FIG. 1.

When in a fully raised position, the bail assembly 70 lies substantially coplanar on the outside edge of the intermediate member 30 such that the armrest is in a compact stored position immediately adjacent the side 16 of seat back 14 as seen in FIG. 1. As the armrest is lowered from this position, the link 90 pivots about pivot axle 94 in a direction opposite Arrow F moving link 82 in a counterclockwise rotation about pivot axle 84 raising the bail assembly 70 in a direction opposite Arrow D in FIGS. 3 and 4 to again extend the armrest outwardly rotating about pivot axle 42 of hinge 40 in a direction opposite Arrow C to the horizontal use position shown in FIGS. 3 and 4.

Another way of conceptualizing the movement of the linkages as the armrest is raised to a stored position is to visualize the member 30 as being stationary and the link 98 rotating clockwise with respect to the stationary intermediate member 30. Since link 82 is pivotally coupled at pivot axle 84 to member 30, movement of link 98 in a clockwise direction with respect to intermediate member 30 will cause the pivot axle 94 to move downwardly while pivot axle 92 moves upwardly thus achieving the rotation indicated by Arrow F. As this occurs, link 82 will pivot in a clockwise direction as shown by Arrow G since pivot axle 92 is moving under pivot axle 84. Of course in the installation, member 30 rotates and link 98 is stationary. Other bail-operated control means extending between the armrest and the first member could provide for the semiautomatic control of the armrest such that when lowered, the armrest is manually raised to a horizontal use position and latches in this position but when the armrest is raised, the movement of the first member releases the latch and collapses the armrest in the same manner as the structure of FIGS. 1-4.

Turning now to FIGS. 5-7, there is shown an alternative embodiment of the present invention with the seat parts being substantially identical to that of the first embodiment but showing an alternative embodiment of the armrest identified by reference numeral 120. Armrest 120 includes a forward supporting section 130 and a rear mounting section 140 with both of the sections having a substantially flat profile as seen in FIGS. 5 and 6. The forward section 130 is coupled to rear section 140 to move downwardly from a raised stored position as, shown in FIG. 5 with section 140, as section 140 is pivoted to a lowered intermediate position for the armrest as shown in FIG. 6. Subsequently, section 130 rotates orthogonally with respect to the rear section 140 as shown in FIG. 7 to present a widened upper support surface 132 for providing an armresting surface. Thus, rear section 140 remains in a generally vertical plane as it rotates between a position shown in FIGS. 5, 6 and 7. Section 130 rotates downwardly as shown in FIG. 6 and then in a plane orthogonal to the vertical plane, i.e. a horizontal plane, to provide the horizontally extending support surface 132.

Each of the sections 130 and 140 of armrest 120 include an outer upholstered surface such as the armresting surface 132 and the correspondingly upholstered outer surface 142 of the rear section 140. The opposite side of the armrest is enclosed with a molded polymeric shell-like cover 134 for the forward section 130 and 144 for the rear section 140. The outer decorative upholstery material 132 and 142 may be fabric wrapped over a padded polymeric shell while the lower surfaces 134 and 144 can be pebble-grained polymeric shells without upholstery to provide smoother interfacing of these surfaces with the upholstered side 16 of seat back 14. A seam 150 thus exists between the forward and rearward sections and allows the relative movement between these sections shown in FIGS. 6 and 7. The outer decorative surfaces of armrest 120 enclose the skeletal framework and functional elements of the armrest which are shown in detail in FIGS. 8 and 9. The lower section 134 includes an actuator button 136 (FIGS. 5 and 7) extending along the forward lower edge of the armrest and which is conveniently located for access by the user. When the armrest is rotated manually downwardly from a position shown in FIG. 5 to a position shown in FIG. 6, the armrest will remain in the position shown in FIG. 6 until the operator depresses the actuator button 136 and rotates the armrest section 130 to a horizontal use position shown in FIG. 7. For retraction of the armrest, button 136 is again depressed and the armrest lowered to a position shown in FIG. 6 and subsequently raised rearwardly to the stored position shown in FIG. 5. Having described the basic operation and functioning of armrest 120, a description of the mechanical elements within the decorative covers 132, 134, 142 and 144 is now presented in connection with FIGS. 8 and 9. For purposes of clarity, these exoskeleton members of armrest 120 are not shown in FIGS. 8 and 9.

Figure 8:
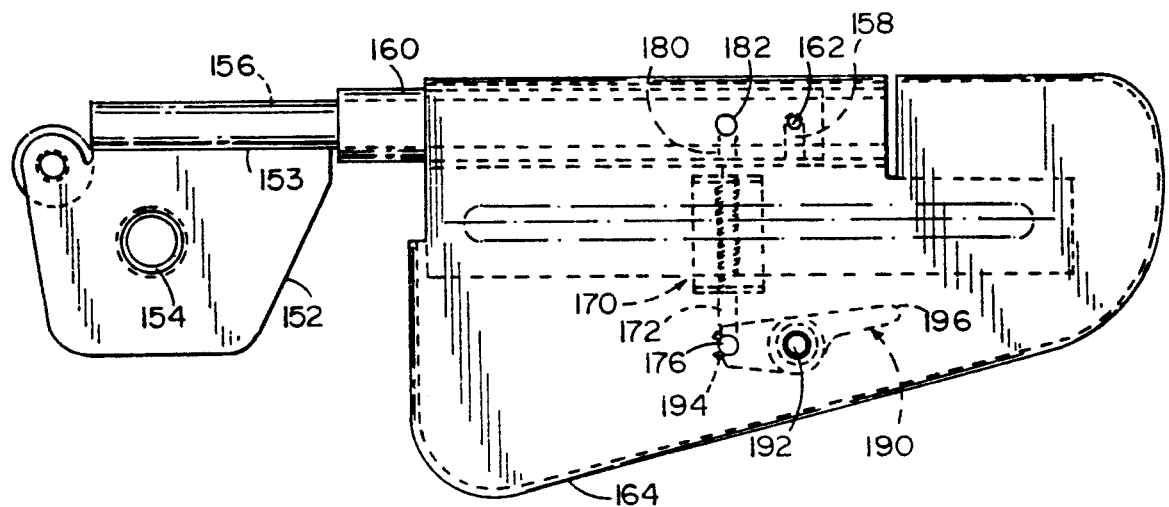
FIG. 8 is a side elevational view of the supporting structure within the armrest shown in FIGS. 5-7.

In FIG. 8, a rotating support plate 152 forming the support for rear section 140 includes a pivot shaft 154 which is fixed with respect to plate 152 and extends within the body of seat 14 and is rotatably mounted thereto by means of a suitable torque fitting to control the rotational feel of the armrest as it moves between the positions shown in FIG. 5 and those of FIGS. 6 and 7. A torque fitting is shown schematically as element 155 in FIG. 9 and can be of the type disclosed in U.S. Pat. No. 4,881,424, issued Nov. 21, 1989, and assigned to the present assignee. Attached to an upper edge 153 of the metal plate 152 is a horizontally extending cylinder 156 welded at the junction 153 of the two members and extending forwardly toward the forward section 130 of the armrest. Surrounding cylinder 156 in coaxial alignment therewith, is a cylindrical tube 160 which has an inner diameter slightly larger than the outer diameter of cylinder 156 and therefore can rotate with respect to cylinder 156, in a direction indicated by Arrow I in FIG. 9 which corresponds to the raising of the forward section 130 of armrest 120 from the vertical position shown in FIG. 6 to the horizontal position shown in FIG. 7. The cylinders 156 and 160 are restrained from longitudinal movement with respect to one another by means of an arcuate radially extending slot 158 formed in the wall of cylinder 156 and a keeper pin 162 extending in a fixed relationship through cylinder 160 and into slot 158 to allow rotation of the two cylinders but prevent longitudinal movement along their axis with respect to one another so that the forward end of armrest 130 remains in juxtaposition with respect to the mounting member 140. Slot 158 extends through an arc of approximately 90° to allow and also limit the movement of the armrest section 130 between the positions shown in FIGS. 6 and 7.

Figure 9:
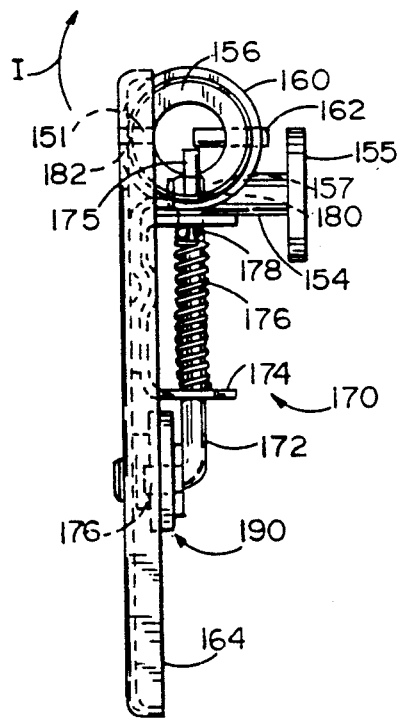
FIG. 9 is a front elevational view of the structure shown in FIG. 8.

Mounted to the outer telescopically-mounted coaxial cylinder 160 is a blade 164 having the general shape and form of the armrest section 132 and over which the decorative covering shells are mounted. Blade 164 supports latching mechanism 170 for locking the forward section 130 of armrest 120 in either of the positions shown in FIGS. 6 and 7. The locking mechanism comprises a spring-loaded L-shaped pin 172 mounted through apertures in the spaced legs of a U-shaped support 174 with a compression spring 176 urging against a cross pin 178 of pin 172 toward a position in which the end 175 of pin 172 extends within one of two apertures 180 or 182 formed in cylinder 160 to lock the cylinders in a selected relative position with respect to one another. Thus, cylinder 160 includes an aperture 182 for the horizontal positioning of the armrest while cylinder 156 includes an aligned aperture 151 which allows the end 175 of pin 172 to extend through both apertures 182 and 151 for looking the two cylinders with respect to one another and holding the armrest in a use position shown in FIG. 7. When the pin 172 is released by the pivoted release lever 190, as described in greater detail below, the armrest can be rotated downwardly and the pin then engages aperture 182 in cylinder 160 and aligned aperture 157 in cylinder 156 as seen in FIG. 9 for locking the armrest in a position shown in FIG. 6, locking the front end of armrest 120 in a position coplanar with the rear section 140 as shown in FIG. 6.

In order to control the latching mechanism 170, and latch pin 172, a lever 190 is pivotally mounted to plate 164 by means of a pivot pin 192. For such purpose, an end 176 of pin 172 remote from end 175 is bent in an L-shape as best seen in FIG. 9 and lever 190 includes a socket 194 which attaches to end 176 for coupling the lever to the pin. End 196 of lever 190 is coupled to the push button actuator 136 which is slidably mounted to the lower housing member 134 in a conventional manner for actuating the lever and therefore the locking pin 172.

Thus, it is seen with the system of the present invention, an armrest is provided which automatically moves between a compact thin silhouette storage position vertically extending and adjacent the side of seat back for storage as shown in FIGS. 1 and 5, and a lowered use position in which at least a portion of the armrest is rotated either automatically or by release of a locking pin and manually to present a relatively wide support surface for the users forearm. The armrests are substantially thin and wide with a thickness of only about 1½ inches but an arm supporting width of about 5 inches. The length of the armrests are conventional and in one embodiment about 13 inches overall. These blade-like dimensions allow for the compact storage of the armrests and yet provide comfortable wide arm supporting surfaces. It will become apparent to those skilled in the art that various modifications to the armrest designs disclosed herein can be made without departing from the spirit or scope of the present invention as defined by the appended claims.

The embodiments of the invention of the invention in which an exclusive property or privilege is claimed are defined as follows:

1. An armrest for a vehicle comprising:
a first member including means for pivotally mounting said first member to a vehicle support member, said first member pivotally movable in a generally vertical plane with respect to the vehicle support member between a first position for storage and a second position for use;
a blade-like member having a width substantially greater than its thickness to define an armrest, and means for rotatably coupling said armrest to said first member for movement in a vertical plane with said first member as said first member is moved between said first position for storage of said armrest and said second position for use of said armrest, said armrest being rotatably mounted to said first member between a generally vertical position when said first member is in said first position and a generally horizontal position when said first member is in said second position; and
control means including at least one pivot link extending between said armrest and said first member for rotating said armrest to a horizontal use position as said first member and armrest are rotated downwardly from said storage position to said use position.

2. The armrest as defined in claim 1 and further including latch means for selectively locking said armrest in said first and second positions.

3. An armrest for a vehicle comprising:
a first member including means for pivotally mounting said first member to a vehicle support member about a first axis;
an armrest and means for pivotally mounting said armrest to said first member for movement about a second axis; and
control means extending between said armrest and said first member and including at least one pivot link pivotally coupled to said first member and coupled to said armrest for moving said armrest between a first position lying substantially in a vertical plane when the armrest is moved to a storage position and a second position in a substantially horizontal plane when said armrest is moved to a second use position.

4. The armrest as defined in claim 3 wherein said armrest includes a blade-shaped body.

5. The armrest as defined in claim 4 wherein said control means further includes a bail pivotally coupled at one end to said armrest and at an opposite end to said pivot link.

6. The armrest as defined in claim 5 wherein said control means includes a plurality of links coupled to one another and between said bail at one end and to said vehicle support member at an opposite end.

7. The armrest as defined in claim 6 wherein said vehicle support member comprises a pivot rod adapted to be mounted to a vehicle seat.

8. An armrest for a vehicle comprising:
a first member including means for pivotally mounting said first member to a vehicle support member, said first member pivotally movable in a generally vertical plane with respect to the vehicle support member between a first position for storage and a second position for use;
an armrest and means including a pair of cylinders for rotatably coupling said armrest to said first member for movement in a vertical plane with said first member as said first member is moved between said first position for storage of said armrest and said second position for use of said armrest; and
latch means for selectively holding said armrest in said first or second positions with respect to said first member wherein said latch means comprises a spring-loaded pin aligned to extend in aperture means formed in said cylinders and aligned with one another to selectively lock said cylinders in position with respect to one another in said first and second positions.

9. The armrest as defined in claim 8 wherein said armrest has a width substantially greater than its thickness when in a horizontal use position such that it can be compactly stored and also provide a relative wide arm supporting surface.

10. The armrest as defined in claim 9 wherein said means for rotatably mounting said armrest to said first member includes a pair of telescopically mounted cylinders and means for limiting the motion of said cylinders with respect to one another.

11. The armrest as defined in claim 10 wherein said motion limiting means comprises an arcuate radially extending slot formed in one of said cylinders and a keeper pin extending into said slot and mounted to the other of said cylinders.

12. The armrest as defined in claim 8 wherein said armrest includes a release button coupled to said latch means and extending from a side of said armrest.

13. An armrest for a vehicle seat comprising:
a planar first member including means for pivotally mounting said first member adjacent a side of a vehicle seat for movement about a first axis;
a blade-shaped armrest and means for pivotally mounting said armrest to said first member for movement about a second axis orthogonal to said first axis; and
control means including at least one pivot link extending between said armrest and said first member for moving said armrest between a first position lying substantially in a vertical plane when the armrest is moved to a storage position lying in a generally vertical plane adjacent the side of the vehicle seat for compact storage and a second position lying in a substantially horizontal plane when said armrest is moved to a second use position.

14. The armrest as defined in claim 13 wherein said control means includes a bail pivotally coupled at one end to said armrest and at an opposite end to said first member.

15. The armrest as defined in claim 14 and further including movable means for coupling said opposite end of said bail to said first member.

16. The armrest as defined in claim 15 wherein said movable means includes said at least one link pivotally coupled to said bail at one end thereof and pivotally coupled to said first member, said at least one link coupled to the vehicle seat to move said bail as said first member is pivoted between said first and second positions.

17. The armrest as defined in claim 16 wherein said pivot means includes a plurality of links coupled to one another and between said bail at one end and to said vehicle seat at an opposite end.

18. The armrest as defined in claim 17 wherein said vehicle seat includes a pivot rod extending from the side thereof and coupled to said opposite end of said links.

* * * * *

UNITED STATES PATENT AND TRADEMARK OFFICE
CERTIFICATE OF CORRECTION

PATENT NO. : 5,320,414
DATED : June 14, 1994
INVENTOR(S) : David J. Spykerman et al.

It is certified that error appears in the above-indentified patent and that said Letters Patent is hereby corrected as shown below:

Column 6, line 68
"looking" should be --locking--.

Signed and Sealed this

Seventh Day of February, 1995

Attest:

BRUCE LEHMAN

Attesting Officer     Commissioner of Patents and Trademarks